United States Patent
Katsuragi

(10) Patent No.: US 9,365,729 B2
(45) Date of Patent: Jun. 14, 2016

(54) TREATMENT LIQUID FOR TREATING RECORDING MEDIUM, IMAGE FORMING METHOD AND IMAGE FORMING APPARATUS

(71) Applicant: Koji Katsuragi, Kanagawa (JP)

(72) Inventor: Koji Katsuragi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 243 days.

(21) Appl. No.: 14/063,375

(22) Filed: Oct. 25, 2013

(65) Prior Publication Data
US 2014/0132662 A1    May 15, 2014

(30) Foreign Application Priority Data
Nov. 9, 2012    (JP) ................... 2012-247014

(51) Int. Cl.
| B41J 11/00 | (2006.01) |
| C09D 7/12 | (2006.01) |
| C09D 11/322 | (2014.01) |
| C09D 11/54 | (2014.01) |
| C09D 11/00 | (2014.01) |
| C09D 11/40 | (2014.01) |

(52) U.S. Cl.
CPC ............ *C09D 7/1233* (2013.01); *B41J 11/0015* (2013.01); *C09D 11/005* (2013.01); *C09D 11/322* (2013.01); *C09D 11/40* (2013.01); *C09D 11/54* (2013.01)

(58) Field of Classification Search
CPC .......... B41J 2/01; B41J 2/2107; B41J 2/2114; B41J 11/0015; C09D 11/005; C09D 11/10; C09D 11/30; C09D 11/322; C09D 11/38; C09D 11/40; C09D 11/54; B41M 5/0011; B41M 5/0017
USPC ................. 347/95–100, 102; 106/31.13, 31.6
See application file for complete search history.

(56) References Cited

U.S. PATENT DOCUMENTS

| 7,223,454 | B1 * | 5/2007 | Bringley et al. ........... 428/32.36 |
| 8,382,271 | B2 | 2/2013 | Goto et al. |
| 2011/0164086 | A1 * | 7/2011 | Ggoto et al. .................... 347/21 |
| 2012/0113195 | A1 | 5/2012 | Katsuragi |
| 2012/0133702 | A1 * | 5/2012 | Kojima .......................... 347/20 |
| 2012/0133703 | A1 * | 5/2012 | Kojima .......................... 347/21 |
| 2012/0169815 | A1 | 7/2012 | Katsuragi |
| 2012/0320137 | A1 | 12/2012 | Fujii et al. |
| 2013/0063524 | A1 | 3/2013 | Katoh et al. |

FOREIGN PATENT DOCUMENTS

| JP | 2005-138504 | 6/2005 |
| JP | 2005-336399 | 12/2005 |
| JP | 2010-030305 | 2/2010 |
| JP | 2011-025504 | 2/2011 |
| JP | 2011-194882 | 10/2011 |
| JP | 2012-162654 | 8/2012 |
| WO | WO2012/108368 A1 | 8/2012 |

* cited by examiner

*Primary Examiner* — Matthew Luu
*Assistant Examiner* — Rut Patel
(74) *Attorney, Agent, or Firm* — Cooper & Dunham LLP

(57) ABSTRACT

To provide a treatment liquid for treating a recording medium, which contains a water-soluble organic solvent, a surfactant, water, and an amphoteric emulsion resin having a core-shell structure.

14 Claims, 7 Drawing Sheets

Conveying direction

TREATMENT LIQUID FOR TREATING RECORDING MEDIUM, IMAGE FORMING METHOD AND IMAGE FORMING APPARATUS

BACKGROUND OF THE INVENTION

1. Field of the Invention

The present invention relates to a treatment liquid for treating a recording medium, and to an image forming method and image forming apparatus, which use the treatment liquid.

2. Description of the Related Art

Conventionally, when recording is performed on a recording medium using an aqueous recording ink, a surface of the recording medium has been treated with a treatment liquid, followed by recording with the aqueous recording ink, in order to improve fixing ability of an image.

For example, it is disclosed that printing is performed on a recording medium using an ink set containing, in combination, an aqueous ink composition composed of at least a colorant, an anionic resin emulsion, and a water-soluble organic solvent, and water, and a reaction liquid containing a reactant, which forms aggregations as it is brought into contact with the aqueous ink composition, and a cationic resin emulsion, to thereby print an image without color blurring or color breeding on the recording medium (see Japanese Patent Application Laid-Open (JP-A) No. 2010-030305).

In accordance with this method, high quality image formation is achieved by a reaction between the anionic resin emulsion in the ink and the cationic resin emulsion in the reaction liquid. Particularly in the case where a recording medium of low absorbency, such as coated paper, is used, however, a problem is caused in fixing of the ink, as the recording medium is transported at high speed, such as in a line engine system.

When a combination of a conventional treatment liquid containing a cationic resin, and an ink composition containing a colorant encapsulated with a carboxyl group-containing resin is used, the pigment is aggregated on the recording medium due to the cationic resin and the carboxyl group, and therefore an image of high density and high quality can be obtained. However, on the other hand, the force for fixing the aggregated colorant is weak, and therefore transfer smears, such as smearing to a convey roller, are often caused especially when a recording medium is conveyed at high speed, such as in a ling engine system. Moreover, it is often a case that a counter ion in a typical cationic resin is chlorine, which may accelerate corrosion of a device for use.

SUMMARY OF THE INVENTION

The present invention aims to provide a treatment liquid for treating a recording medium, which is used together with an aqueous recording ink, and is used for forming an image having excellent qualities that are low transfer density, excellent glossiness, and inhibition of beading.

As for the means for solving the aforementioned problems, the treatment liquid for treating a recording medium of the present invention contains a water-soluble organic solvent, a surfactant, water, and an amphoteric emulsion resin having a core-shell structure.

The present invention can solve the aforementioned various problems in the art, and can provide a treatment liquid for treating a recording medium, with which an image having excellent qualities, that are low transfer density, excellent glossiness, and inhibition of beading, can be formed on a recording medium.

Figure 1:
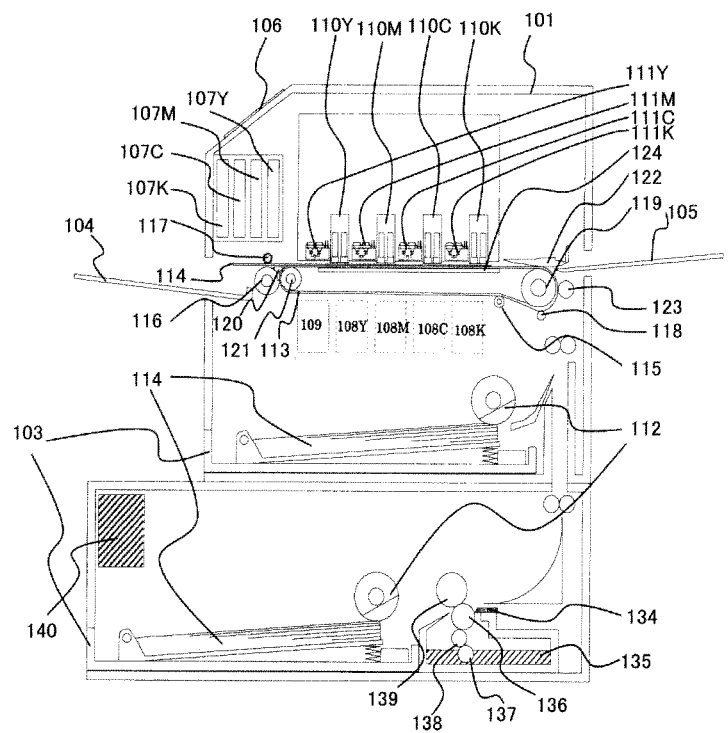
FIG. 1 is a schematic side view illustrating one example of an image forming apparatus (liquid ejecting device) used for the image forming method of the present invention.

DETAILED DESCRIPTION OF THE INVENTION (Treatment Liquid for Treating Recording Medium)

The treatment liquid for treating a recording medium (may be merely referred to as a "treatment liquid" hereinafter) of the present invention contains a water-soluble organic solvent, surfactant, water, and an amphoteric emulsion resin having a core-shell structure, and may further contain other components, if necessary.

First, each component for constituting the treatment liquid will be described hereinafter.

[Composition of Treatment Liquid]

<Water-Soluble Organic Solvent>

In the treatment liquid, water and a water-soluble organic solvent are used as solvents. Examples of the water-soluble organic solvent include polyhydric alcohol, polyhydric alcohol alkyl ether, polyhydric alcohol aryl ether, a nitrogen-containing heterocyclic compound, amide, amine, a sulfur-containing compound, propylene carbonate, and ethylene carbonate.

Examples of the polyhydric alcohol include glycerin, 1,3-butanediol, 3-methyl-1,3-butanediol, 1,5-pentanediol, 1,6-hexanediol, ethylene glycol, diethylene glycol, triethylene glycol, tetraethylene glycol, polyethylene glycol, propylene glycol, dipropylene glycol, tripropylene glycol, polypropylene glycol, hexylene glycol, trimethylol ethane, trimethylol propane, 1,2,3-butanetriol, 1,2,4-butanetriol, 1,2,6-hexanetriol, and 3-methyl-1,3,5-pentanetriol.

Examples of the polyhydric alcohol alkyl ether include ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether.

Examples of the amine include monoethanol amine, diethanol amine, triethanol amine, monoethyl amine, diethyl amine, and triethyl amine.

Examples of the sulfur-containing compound include dimethyl sulfoxide, sulfolane, and thiodiethanol.

Among these water-soluble organic solvents, particularly preferred are glycerin, diethylene glycol, 1,3-butanediol, and 3-methyl-1,3-butanediol. These organic solvents exhibit excellent effects on solubility, and prevention of jet failures caused by moisture evaporation. Moreover, use of any of these organic solvents can realize formation of a treatment liquid having excellent storage stability and ejection stability.

<Amphoteric Emulsion Resin>

The amphoteric emulsion resin for use in the present invention an emulsion of a dual structure having a core-shell structure, where a core is cationic and a shell is anionic, or the core is anionic and the shell is cationic. Since both cationic and anionic functional groups are contained within the structure of the emulsion, these functional groups react with a carboxyl group-containing resin in an aqueous recording ink to achieve high density. In addition, the amphoteric emulsion resin can be blended with an anionic emulsion or anionic additives, while having a cationic component therein. Moreover, the amphoteric emulsion resin has the low minimum film forming temperature, i.e., 5° C., and therefore, the amphoteric emulsion resin has excellent film forming ability within a short time, which leads to excellent fixing ability of an aqueous recording ink, and high glossiness of a resulting image.

Moreover, it is often a case that a counter ion used in a typical cationic resin is chlorine, which may become a factor for corroding a device. In the amphoteric emulsion resin used in the present invention, however, anion and cation are bonded together within a particle in the same structure, and therefore the aforementioned problem does not occur. An amount of the amphoteric emulsion resin for use in the present invention is preferably 1% by mass to 20% by mass, more preferably 10% by mass to 20% by mass.

The amphoteric emulsion resin is not particularly limited, and may be appropriately synthesized for use, or selected from commercial products. Examples of the commercial product thereof include: AKW series (the core is cationic, the shell is anionic), and RKW series (the core is anionic, the shell is cationic), both manufactured by TAISEI FINE CHEMICAL CO., LTD. Examples of the amphoteric emulsion resin where the core is cationic and the shell is anionic include Acrit AKW-107 manufactured by TAISEI FINE CHEMICAL CO., LTD. Moreover, examples of the amphoteric emulsion resin where the core is anionic and the shell is cationic include Acrit RKW-620 manufactured by TAISEI FINE CHEMICAL CO., LTD.

The aforementioned commercial products are each in an emulsion state where a resin is dispersed in a solvent. In this case, the term "emulsion resin" used in the present specification means a resin present in an emulsion.

<Polyurethane Resin>

By using the amphoteric emulsion resin and a polyurethane resin in combination, shelf stability and fixing ability can be improved, compared to a case where only the amphoteric emulsion resin is used. Use of the polyurethane resin can give flexibility to a resulting treatment liquid, even in the case where the treatment liquid is applied onto a recording medium. As the amphoteric emulsion resin is used in the treatment liquid of the present invention, both an anionic polyurethane resin and a cationic polyurethane resin can be used as the polyurethane resin. An amount of the polyurethane resin for use in the present invention is preferably 1% by mass to 10% by mass, more preferably 5% by mass to 10% by mass.

The polyurethane resin is not particularly limited, and may be appropriately synthesized for use, or selected from commercial products. Examples of the commercial product thereof include Rikabond SU-100N manufactured by CSC Co., Ltd., IMPRANIL XP2611 manufactured by Sumika Bayer Urethane Co., Ltd., and HYDRAN series manufactured by DIC Corporation.

<Surfactant>

The surfactant is added to the treatment liquid for the purpose of reducing surface tension of the treatment liquid. Examples of characteristics required for the treatment liquid of the present invention include appropriate wettability to various recording media, and ejectability without any unevenness. By giving appropriate wettability, a penetration speed of the treatment liquid to various recording media can be increased, and as a result, problems in fixing or bleeding can be prevented. Especially, the penetration of the treatment liquid to various recording media is very important.

If the penetration of the treatment liquid is insufficient, a large amount of the treatment liquid is retained adjacent to a surface of a recording medium. As a result, when the treatment liquid is brought into contact with an aqueous recording ink containing a colorant on the surface of the recording medium, a carboxyl group-containing resin encapsulating the colorant in the aqueous recording ink is aggregated in an excessive degree to reduce a diameter of a dot, to thereby cause insufficient filling of a solid image. In addition, as an excessive amount of the colorant component is retained on the surface of the recording medium, a problem, such as low fixing ability may be caused. For the reasons described above, it is typical that a surfactant is added to reduce surface tension and to improve wettability. Specifically, as for the surfactant, at least one selected from the group consisting of polyoxyalkylene alkyl ether and a fluorosurfactant represented by the following structural formula (1) is particularly preferable.

$$C_4F_9-CH_2CH(OH)CH_2O-(CH_2CH_2O)_{23}-CH_2CH(OH)CH_2-C_4F_9 \quad \text{Structural Formula (1)}$$

Note that, the fluorosurfactant represented by the structural formula above does not contain PFOS (perfluorooctane sulfonate) and PFOA (perfluorooctanoic acid), and use of such fluorosurfactant is excellent, as there is no concern regarding possible environmental pollution.

In the case where the surfactant is polyoxyalkylene alkyl ether, an amount of the surfactant is preferably 0.5% by mass to 3% by mass, more preferably 1% by mass to 2% by mass. In the case where the surfactant is the fluorosurfactant represented by the structural formula (1), an amount of the surfactant is preferably 0.01% by mass to 4% by mass, more preferably 0.1% by mass to 1% by mass.

<Defoaming Agent>

However, particularly the fluorosurfactant having the structure above has extremely high surface activation ability. Even using such fluorosurfactant in combination with a typically used silicone-based defoaming agent, once air bubbles are generated, the air bubbles remain without being disappeared, which may cause jetting failures or uneven application of the treatment liquid when the treatment liquid is ejected by an ejecting heat or the like. In the present invention, therefore, at least one selected from the group consisting of N-octyl-2-pyrrolidone, 2,4,7,9-tetramethyldecane-4,7-diol, and 2,5,8,11-tetramethyldodecane-5,8-diol is added in order to prevent generation of air bubbles. By using one of the aforementioned defoaming agents and the surfactant in combination, generation of air bubbles can be inhibited, and a problem associated with air bubbles can be solved.

The surface tension of the treatment liquid of the present invention is determined with a ratio between the surfactant and the defoaming agent. In the case where the surface tension of the treatment liquid needs to be reduced depending on a type of a recording medium for use, a ratio of the surfactant is increased. Naturally, a problem associated with foaming is caused as the ratio of the surfactant is increased. Therefore the ratio of the surfactant is preferably 40% by mass or less, more preferably 30% by mass or less, relative to a total amount of the surfactant and the defoaming agent.

(Image Forming Method and Image Forming Apparatus)

The image forming method of the present invention contains a treatment liquid applying step, and a recording ink applying step, and may further contain other steps, if necessary.

The image forming apparatus of the present invention contains a treatment liquid applying unit, and a recording ink applying unit, and may further contain other units, if necessary.

<Treatment Liquid Applying Step and Treatment Liquid Applying Unit>

The treatment liquid applying step is applying a treatment liquid onto a recording medium, and is performed by a treatment liquid applying unit.

As for the treatment liquid, the treatment liquid for treating a recording medium of the present invention is used.

The treatment liquid applying unit is appropriately selected depending on the intended purpose without any limitation, provided that the treatment liquid applying unit is a unit configured to apply the treatment liquid on a recording medium.

The treatment liquid applying step is not particularly limited, as long as the treatment liquid applying step uses a coating system by which the treatment liquid is uniformly applied onto a surface of a recording medium.

Examples of the coating system include blade coating, gravure coating, gravure offset coating, wire bar coating, bar coating, roller coating, knife coating, air knife coating, comma coating, U-comma coating, AKKU coating, smoothing coating, microgravure coating, reverse roller coating, four-roller or five-roller coating, dip coating, curtain coating, slide coating, and die coating.

The treatment liquid applying step may be performed on a recording medium surface of which is completely dried, or on a recording medium on which an image is formed and is being dried. In both cases, the treatment liquid applying step exhibits its effect.

Note that, a drying step can be optionally provided to a recording medium which has been treated with the treatment liquid.

In this case, the recording medium can be dried by a roller heater, drum heater, or hot air.

A wet deposition amount of the treatment liquid onto the recording medium during the treatment liquid applying step is preferably in the range of 0.1 $g/m^2$ to 30.0 $g/m^2$, more preferably 0.2 $g/m^2$ to 10.0 $g/m^2$.

When the deposition amount thereof is less than 0.1 $g/m^2$, image quality (image density, color saturation, and prevention of color breeding, character blurring, and white missing points) may be hardly improved. When the deposition amount thereof is more than 30.0 $g/m^2$, texture as plain paper used as a recording medium may be impaired, or curling of a recording medium may occur.

[Recording Medium]

The recording medium is appropriately selected depending on the intended purpose without any limitation. As for the recording medium, for example, preferably used are plain paper, gloss paper, special paper, cloth, a film, an OHP sheet, and general-purpose printing paper.

Note that, when the aqueous recording ink is printed on a recording medium, water, which is a main component of the recording ink, penetrates inside the recording medium or evaporated into the air. As a result, the colorant solids are retained on a surface of the recording medium. In the case where a recording medium of non- or low ink absorbency is used, however, water does not sufficiently penetrate inside the recording medium, and as a result, water containing a colorant component is remained on a surface of the recording medium, which may impair abrasion resistance of a resulting image. However, the treatment liquid of the present invention can be suitably used for a recording medium of non- or low ink absorbency, and therefore use of the treatment liquid can provide a desirable image having excellent abrasion resistance.

<Recording Ink Applying Step and Recording Ink Applying Unit>

The recording ink applying step is applying a recording ink onto the recording medium, and is performed by a recording ink applying unit.

The recording ink applying unit contains an image forming unit configured to jet an ink on a surface of a recording medium to form an image, a retaining unit configured to retain a treatment liquid, and a treating unit configured to perform a treatment on the surface of the recording medium before or after the image formation performed by the image forming unit. Moreover, the image forming unit contains at least an ink jet unit, and may contain other units, such as a stimuli generating unit, and a controlling unit, if necessary.

[Aqueous Recording Ink]

The aqueous recording ink contains a colorant, an organic solvent, a surfactant, and water, preferably further contains a carboxyl group-containing resin, and may further contain other components, if necessary.

<<Colorant>>

As for the colorant, any of conventional dyes or pigments can be used in the aqueous recording ink.

Moreover, colorant particles, in each of which an inorganic particle is covered with an organic pigment or carbon black, may be used as the colorant.

Examples of a method for covering the inorganic particles with carbon black include: liquid drying using coagulation or precipitation; and dry mixing where mechanical force is applied with mixing. Moreover, examples of a method for covering the inorganic particles with an organic pigment include: a method in which the organic pigment is precipitated in the presence of the inorganic particles; and a method in which the inorganic particles and the organic pigment are mechanically mixed and ground. For example, in the case where the inorganic particles are covered with an organic pigment having excellent thermal stability, chemical deposition may be used. Moreover, an organosilane compound layer formed of polysiloxane or alkyl silane may be optionally provided between the inorganic particle and the organic pigment. Use of the organosilane compound layer can improve adhesion between the inorganic particle and the organic pigment.

Examples of the inorganic particles include titanium dioxide, silica, alumina, iron oxide, iron hydroxide, and tin oxide. As for shapes of the inorganic particles, those having a small aspect ratio are preferable, spherical shapes are more preferable. In the case where a color colorant is adsorbed on surfaces of the inorganic particles, moreover, the inorganic particles are preferably colorless transparent or white. In the case where a black colorant is adsorbed, black inorganic particles may be used.

The primary particle diameter of the inorganic particles is preferably 100 nm or smaller, more preferably 5 nm to 50 nm.

As for the organic pigment covering the inorganic particles, examples of the black pigment thereof include carbon black, and aniline black. Examples of the color pigment thereof include anthraquinone, phthalocyanine blue, phthalocyanine green, diazo, monoazo, pyranthrone, perylene, heterocyclic yellow, quinacridon, and (thio)indigoid.

Among them, a phthalocyanine-based pigment, a quinacridon-based pigment, a monoazo yellow-based pigment, a disazo yellow-based pigment, and a heterocyclic yellow pigment are preferable in view of coloring ability thereof.

Examples of the phthalocyanine-based pigment include copper phthalocyanine blue and derivatives thereof (C.I. PIGMENT BLUE 15:3, 15:4), and aluminum phthalocyanine.

Examples of the quinacridon-based pigment include PIGMENT ORANGE 48, C.I. PIGMENT ORANGE 49, C.I. PIGMENT RED 122, C.I. PIGMENT RED 192, C.I. PIGMENT RED 202, C.I. PIGMENT RED 206, C.I. PIGMENT RED 207, C.I. PIGMENT RED 209, C.I. PIGMENT VIOLET 19, and C.I. PIGMENT VIOLET 42.

Examples of the monoazo yellow-based pigment include C.I. PIGMENT YELLOW 74, C.I. PIGMENT YELLOW 109, C.I. PIGMENT YELLOW 128, and C.I. PIGMENT YELLOW 151.

Examples of the disazo yellow-based pigment include C.I. PIGMENT YELLOW 14, C.I. PIGMENT YELLOW 16, and C.I. PIGMENT YELLOW 17.

Examples of the heterocyclic yellow-based pigment include C.I. PIGMENT YELLOW 117, and C.I. PIGMENT YELLOW 138.

A mass ratio (inorganic particle:colorant) of the inorganic particles to the colorant, which is an organic pigment or carbon black, is preferably 3:1 to 1:3, more preferably 3:2 to 1:2. When the ratio of the colorant is too small, coloring or tinting strength may be insufficient. When the ratio of the colorant is too large, transparency or color tone may be impaired.

Examples of a commercial product of the colorant particles, in each of which an inorganic particle is covered with an organic pigment or carbon black, include a silica/carbon black composite material, a silica/phthalocyanine C.I. PIGMENT BLUE 15:3 composite material, a silica/disazo yellow composite material, and a silicalquinacridon C.I. PIGMENT RED 122 composite material (all manufactured by TODA KOGYO CORPORATION). These can be suitably used as primary particle diameters thereof are small.

In the case where norganic particles having the primary particle diameter of 20 nm are covered with an equal amount of an organic pigment, the primary diameter of resulting colorant particles is about 25 nm. If such colorant particles can be dispersed in the state of primary particles using an appropriate dispersant, a very fine pigment dispersed ink having a dispersed particle diameter of 25 nm can be produced.

The primary particle diameter of the colorant particles in the aqueous recording ink is preferably 5 nm to 100 nm, more preferably 30 nm to 80 nm. When the primary particle diameter thereof is smaller than 5 nm, the recording ink may increase its viscosity or colorant particles therein may be aggregated after storage of lone period. When the primary particle diameter thereof is greater than 100 nm, in the case where a recording ink is printed on a recording medium, such as paper, and a film, a resulting print may have a printed area where color saturation and color value are low. Note that, the primary particle diameter of the colorant particles means the minimum unit of the colorant particles which cannot be made any finer by mechanical shearing.

An amount of the colorant particles in the aqueous recording ink is preferably 1% by mass to 20% by mass, more preferably 2% by mass to 15% by mass.

<<Water-Soluble Organic Solvent>>

Examples of the water-soluble organic solvent include polyhydric alcohol, polyhydric alcohol alkyl ether, polyhydric alcohol aryl ether, a nitrogen-containing heterocyclic compound, amide, amine, a sulfur-containing compound, propylene carbonate, and ethylene carbonate.

Examples of the polyhydric alcohol include glycerin, 1,3-butanediol, 3-methyl-1,3-butanediol, 1,5-pentanediol, 1,6-hexanediol, ethylene glycol, diethylene glycol, triethylene glycol, tetraethylene glycol, polyethylene glycol, propylene glycol, dipropylene glycol, tripropylene glycol, polypropylene glycol, hexylene glycol, trimethylol ethane, trimethylol propane, 1,2,3-butanetriol, 1,2,4-butanetriol, 1,2,6-hexanetriol, and 3-methyl-1,3,5-pentanetriol.

Examples of the polyhydric alcohol alkyl ether include ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether.

Examples of the polyhydric alcohol aryl ether include ethylene glycol monophenyl ether, and ethylene glycol monobenzyl ether.

Examples of the nitrogen-containing heterocyclic compound include 2-pyrrolidone, N-methyl-2-pyrrolidone, N-hydroxyethyl-2-pyrrolidone, 1,3-dimethylimidazolidinone, $\epsilon$-caprolactam, and $\gamma$-butyrolactone.

Examples of the amine include monoethanol amine, diethanol amine, triethanol amine, monoethyl amine, diethyl amine, and triethyl amine.

Examples of the sulfur-containing compound include dimethyl sulfoxide, sulfolane, and thiodiethanol.

Among these water-soluble organic solvents, particularly preferred are glycerin, 1,3-butanediol, and 3-methyl-1,3-butanediol. These organic solvents exhibit excellent solubility, and an excellent effect of preventing jetting failures, which may be caused by evaporation of moisture. Moreover, use of any of these organic solvents achieves production of an aqueous recording ink having excellent shelf stability and ejection stability.

<<Surfactant>>

The surfactant is not particularly limited, and may be appropriately selected from surfactants that do not impair dispersion stability, depending on a colorant for use, or a combination with a water-soluble organic solvent, or a penetrating agent. Particularly in the case where the aqueous recording ink is printed on a recording medium, the surfactant for use is preferably a fluorosurfactant or silicone-based surfactant, which has low surface tension and a high leveling effect. The fluorosurfactant is particularly preferable.

As for the fluorosurfactant, for example, particularly preferred are a perfluoroalkyl sulfonic acid compound, a perfluoroalkyl carboxylic acid compound, a perfluoroalkyl phosphoric acid ester compound, a perfluoroalkyl ethylene oxide adduct, and a polyoxyalkylene ether polymer compound having a perfluoroalkyl ether group at a side chain thereof, as these surfactants have low foamability.

The fluorosurfactant may be appropriately synthesized for use, or selected from commercial products. Examples of the commercial product thereof include: SURFLON series (S-111, S-112, S-113, S-121, S-131, S-132, S-141, S-145) manufactured by Asahi Glass Co., Ltd.; FLOURAD series (FC-93, FC-95, FC-98, FC-129, FC-135, FC-170C, FC-430, FC-431) manufactured by Sumitomo 3M limited; MEGAFACE series (F-470, F-1405, F-474) manufactured by DIC Corporation; Zonyl TBS, FSP, FSA, FSN-100, FSN, FSO-100, FSO, FS-300, UR, all manufactured by Du Pont Kabushiki Kaisha; FT-110, FT-250, FT-252, FT-400S, FT-150, FT-400SW, all manufactured by NEOS COMPANY LIMITED; and PF-151N manufactured by Omnova Solutions, Inc. Among them, the fluorosurfactant represented by the following structural formula (1) is particularly preferable.

$C_4F_9$—$CH_2CH(OH)CH_2O$—$(CH_2CH_2O)_{23}$—$CH_2CH(OH)CH_2$—$C_4F_9$   Structural Formula (1)

Note that, the fluorosurfactant represented by the structural formula (1) does not contain PFOS (perfluorooctane sulfonate) and PFOA (perfluorooctanoic acid), and use of such fluorosurfactant is excellent, as there is no concern regarding possible environmental pollution.

An amount of the surfactant in the aqueous recording ink is preferably 0.01% by mass to 4% by mass, more preferably 0.1% by mass to 1% by mass.

<<Defoaming Agent>>

However, particularly the fluorosurfactant having the structure above has extremely high surface activation ability. Even using such fluorosurfactant in combination with a typically used silicone-based defoaming agent, once air bubbles are generated, the air bubbles remain without being disappeared, which may cause jetting failures or uneven application of the aqueous recording ink when the aqueous recording ink is ejected by an ejecting heat or the like. In the present invention, therefore, at least one selected from the group consisting of N-octyl-2-pyrrolidone, 2,4,7,9-tetramethyldecane-4,7-diol, and 2,5,8,11-tetramethyldodecane-5,8-diol is added in order to prevent so generation of air bubbles. By using one of the aforementioned defoaming agents and the surfactant in combination, generation of air bubbles can be inhibited, and a problem associated with air bubbles can be solved.

The surface tension of the aqueous recording ink for use in the present invention is determined based on a ratio between the fluorosurfactant and the defoaming agent. In the case where it is necessary to reduce the surface tension of the aqueous recording ink considering a type of a recording medium for use, a ratio of the fluorosurfactant needs to be increased. However, a problem of foaming is naturally caused, as the ratio of the fluorosurfactant is increased. Accordingly, the ratio of the fluorosurfactant is preferably 40% by mass or less, more preferably 30% by mass or less, relative to a total amount of the fluorosurfactant and the defoaming agent.

<<Carboxyl Group-Containing Resin>>

The aqueous recording ink for use in the present invention contains a carboxyl group-containing resin. As the aqueous recording ink contains a carboxyl group-containing resin, the carboxyl group-containing resin in the aqueous recording ink reacts with the amphoteric emulsion resin and organic acid contained in the treatment liquid, to cause aggregation of a pigment on a recording medium. As a result of this, a high quality image can be formed. Note that, even in the case here the treatment liquid is not present on the recording medium, a resulting image can be expected to have improved abrasion resistance, as the aqueous recording ink contains the carboxyl group-containing resin.

Examples of the carboxyl group-containing resin include a maleic acid resin, a styrene-maleic acid resin, a rosin-modified maleic acid resin, an alkyd resin, and a modified alkyd resin. Examples of the commercial product thereof include: MALKYD series manufactured by Arakawa Chemical Industries, Ltd.; and HARIMACK series, and HARIPHTHAL series manufactured by Harima Chemicals Group, Inc. For example, the carboxyl group-containing resin can be synthesized by the synthesis examples described later.

As for an embodiment for adding the carboxyl group-containing resin, the carboxyl group-containing resin may be added in the state where a pigment serving as the colorant is encapsulated (microcapsulated) with the carboxyl group-containing resin, or the carboxyl group-containing resin may be added in the state where the colorant is dispersed in the carboxyl group-containing resin.

<<Other Components>>

In addition to the components mentioned above, the aqueous recording ink may optionally contain a conventional penetrating agent, pH regulator, antiseptic/antifungal agent, and anti-rust agent.

As for the penetrating agent, a C8-C11 polyol compound or a so glycol ether compound is preferably used. These have effect of increasing the penetration speed to a recording medium and preventing bleeding, and are partially water-soluble compounds each having solubility of 0.1% by mass to 4.5% by mass in water of 25° C.

Examples of the C8-C11 polyol compound include 2-ethyl-1,3-hexanediol, 2,2,4-trimethyl-1,3-pentanediol, and 1,2-octanediol.

Examples of the glycol ether compound include a polyhydric alcohol alkyl ether compound, and a polyhydric alcohol aryl ether compound.

Examples of the polyhydric alcohol alkyl ether compound include ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether.

Examples of the polyhydric alcohol aryl ether compound include ethylene glycol monophenyl ether, and ethylene glycol monobenzyl ether.

These penetrating agents each have a higher boiling point than that of water, and are each component that is present as a liquid at 25° C. An amount of the penetrating agent in the aqueous recording ink is preferably 0% by mass to 10% by mass, more preferably 0.5% by mass to 5% by mass.

Examples of the pH regulator include alcohol amine, alkali metal hydroxide, ammonium hydroxide, phosphonium hydroxide, and alkali metal carbonate.

Examples of the alcohol amine include diethanol amine, triethanol amine, and 2-amino-2-ethyl-1,3-propane diol.

Examples of the alkali metal hydroxide include lithium hydroxide, sodium hydroxide, and potassium hydroxide.

Examples of the ammonium hydroxide include ammonium hydroxide, and quaternary ammonium hydroxide. Examples of the phosphonium hydroxide include quaternary phosphonium hydroxide.

Examples of the alkali metal carbonate include lithium carbonate, sodium carbonate, and potassium carbonate.

Examples of the antiseptic/antifungal agent clude sodium dehydroacetate, sodium sorbate, sodium-2-pyridinethiol-1-oxide, sodium benzoate, and sodium pentachlorophenol.

Examples of the anti-rust agent include acidic sulfite salt, sodium thiosulfate, ammonium thiodiglycolate, diisopropyl ammonium nitrite, pentaerythritol tetranitrate, and dicyclohexyl ammoonium nitrite.

<Ink Cartridge>

A cartridge charged with the treatment liquid of the present invention or the aqueous recording ink is a cartridge in which the treatment liquid or the aqueous recording ink is housed in a container, and may further contain appropriately selected other members, if necessary.

The container is not particularly limited, and a shape, structure, size, and material thereof can be appropriately selected depending on the intended purpose. Examples of the container include a plastic container, and an ink bag formed of an aluminum laminate film.

Figure 5:
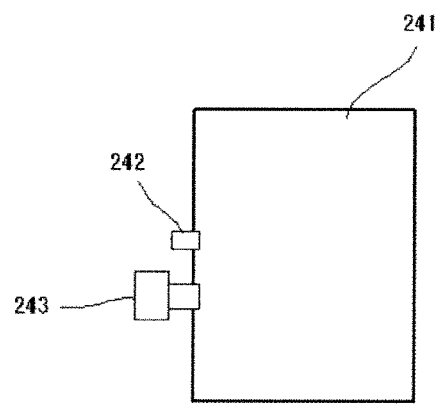
FIG. 5 is a diagram illustrating one example of an ink cartridge used in an image forming apparatus used for the image forming method of the present invention.
Figure 6:
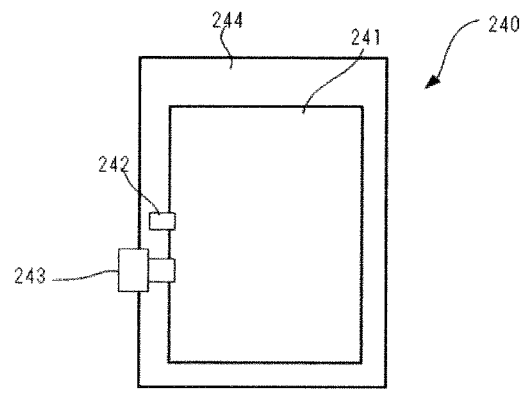
FIG. 6 is a diagram illustrating the ink cartridge of FIG. 5 including a casing (exterior).

Specific examples thereof include the one having the structure illustrated in FIGS. 5 and 6 described below. The details of FIGS. 5 and 6 are described later.

The image forming apparatus (device for ejecting a liquid) for use in the present invention contains an image forming unit configured to jet an ink on a surface of a recording medium to form an image, a retaining unit configured to retain a treatment liquid, and a treating unit configured to perform a treatment on the surface of the recording medium before or after the image formation performed by the image forming unit.

Moreover, the image forming unit contains at least an ink jet unit, and may contain other units, such as a stimuli generating unit, and a controlling unit, if necessary.

Here, a schematic diagram (side explanatory view) of one example of the device for ejecting a liquid for use in the present invention is depicted in FIG. 1.

The device for ejecting a liquid 101 is equipped with head units 110K, 110C, 110M, 110Y in each of which heads for ejecting an aqueous recording ink are collectively provided. Moreover, the device for ejecting a liquid 101 is equipped with maintenance units 111K, 111C, 111M, 111Y each corresponding to each head unit to perform a maintenance of heads, ink cartridges 107K, 107C, 107M, 107Y for supplying an ink, and sub ink-tanks 108K, 108C, 108M, 108Y for storing part of the ink supplied from the cartridge and supplying the ink to the head at an appropriate pressure.

The device for ejecting a liquid 101 further contains a discharging system including a convey belt 113 for suctioning a recording medium 114 by a suction fan 120 and conveying the recording medium 114, conveying rollers 119, 121, for supporting the convey belt 113, a tension roller 115 for controlling so that the convey belt 113 keeps an appropriate tension, a platen 124 and platen roller 118 for giving an appropriate flatness to the convey belt 113, a charging roller 116 for giving static charges so that the recording medium 114 is adhered, a discharging roller 117 for pressing the recording medium 114, and a discharging tray 104 for storing the discharged recording medium 114, and a feeding system including a feeding tray 103 for storing recording media 114 to be printed, separation pads 112 and 122 for sending the recording media 114 one by one from the feeding tray 103, a counter roller 123 for securely adhering the sent recording medium 114 to the charging belt, and a manual feeding tray 105 used in the case where paper is fed manually.

Furthermore, the device for ejecting a liquid 101 is equipped with a waste liquid tank 109 for collecting the waste liquid discharged after the maintenance, and a control panel 106 capable of displaying operating the devise and displaying the state of the device.

A nozzle array of each head unit is aligned so as to be orthogonal to the conveyance direction of the recording medium 114, and is formed so as to be longer than a length of a recording region. The recording media 114 stored in the feeding tray are separated into one piece by a separation roller, and the separated recording medium is fixed onto the convey belt by being pressed on the convey belt by a press roller. When the recording medium is passed under the head unit, the recording medium is patterned with droplets at high speed by jetting droplets to the recording medium. The recording medium is then separated from the convey belt by a separation craw, and discharged as a recorded matter into the discharging tray by a discharging roller and another discharging roller.

For this device, a coating system is provided as a system for treating a surface of a recording medium with a treatment liquid, and uses roller coating. The treatment liquid 135 is supplied from the treatment liquid storage tank 140 through a path (not illustrated), and taken out to a surface of a roller by a pumping roller 137, and is transferred to a film thickness controlling roller 138. The treatment liquid then transferred to the coating roller 136 is transferred to and applied to a recording medium 114 passed through between the coating roller 136 and the counter roller for coating 139.

The amount of the treatment liquid transferred to the coating roller 136 is controlled by adjusting the nip thickness with the coating roller 136. When an application of the treatment liquid is not desired, the treatment liquid present on the surface of the coating roller 136 can be scraped by pressing a movable blade 134 against the coating roller 136 so as not to leave the treatment liquid on the surface of the coating roller. In this manner, functional disorders caused by the residual treatment liquid on the coating roller 136 (e.g., increased viscosity due to the dried treatment liquid, bonding to the counter coating roller 139, and uneven application) can be prevented in advance. Alternatively, as illustrated in FIG. 1, another coating mechanism may be employed where feeding sections are provided at the upper side and the bottom side respectively. In this mechanism, the bottom feeding section is used when the treatment liquid is coated, and the upper feeding section is used when the treatment liquid is not coated.

Other than the aforementioned roller coating, the treatment liquid can also be spray-coated by an inkjet system. For example, a head similar to the head unit 110K is charged with the treatment liquid, and the treatment liquid is ejected onto a recording medium 114 in the same manner as when the ink is ejected. In this manner, an amount of the treatment liquid to be ejected, and a position for ejection can be controlled easily, and highly precisely. Moreover, the roller coating and spray coating may be used in combination.

Whichever system is used, the treatment liquid can be applied to a desired position in a desired amount.

Furthermore, by heating the recording medium onto which the treatment liquid and the ink have been applied by a hot air fan 150, the drying is accelerated to thereby improve fixing ability. Note that, in the present invention, the heating step is performed on the recording medium after the printing by means of a hot blast fan. However, the heating step may be performed on the recording medium before or after the printing, and may be performed by other members, such as a heat roller, other than the hot blast fan.

Figure 3:
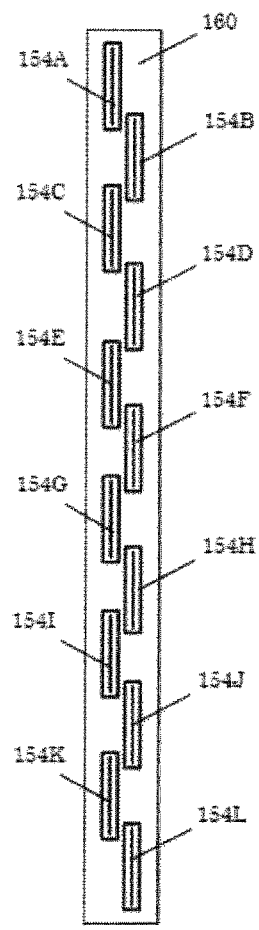
FIG. 3 is a schematic diagram illustrating one example of a head array in a head unit of an image forming apparatus used for the image forming method of the present invention.

FIG. 3 is a schematic diagram illustrating one example of head alignment of the head unit of the device for ejecting the liquid.

The head unit contains heads 154A to 154L fixed on the head circumferential member 160, and the heads are fixed with a staggered arrangement so that the heads overlap with part of nozzle.

Figure 4:
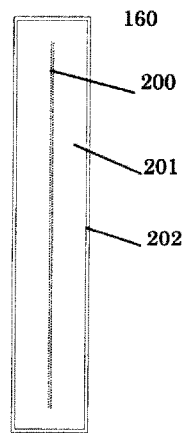
FIG. 4 is a schematic diagram illustrating a head aligned in the head unit of FIG. 3.

FIG. 4 is a schematic diagram illustrating heads aligned on the head unit of FIG. 3. Each head has a nozzle 200 which is two arrays of openings provided in a nozzle plate 201 in a staggered arrangement. The head and the head circumferential member are sealed with a filler 202 to remove any space from the side surface of the nozzle.

Next, outlines of the control unit of the device for ejecting a liquid illustrated in FIG. 1 are explained with reference to FIG. 2

Figure 2:
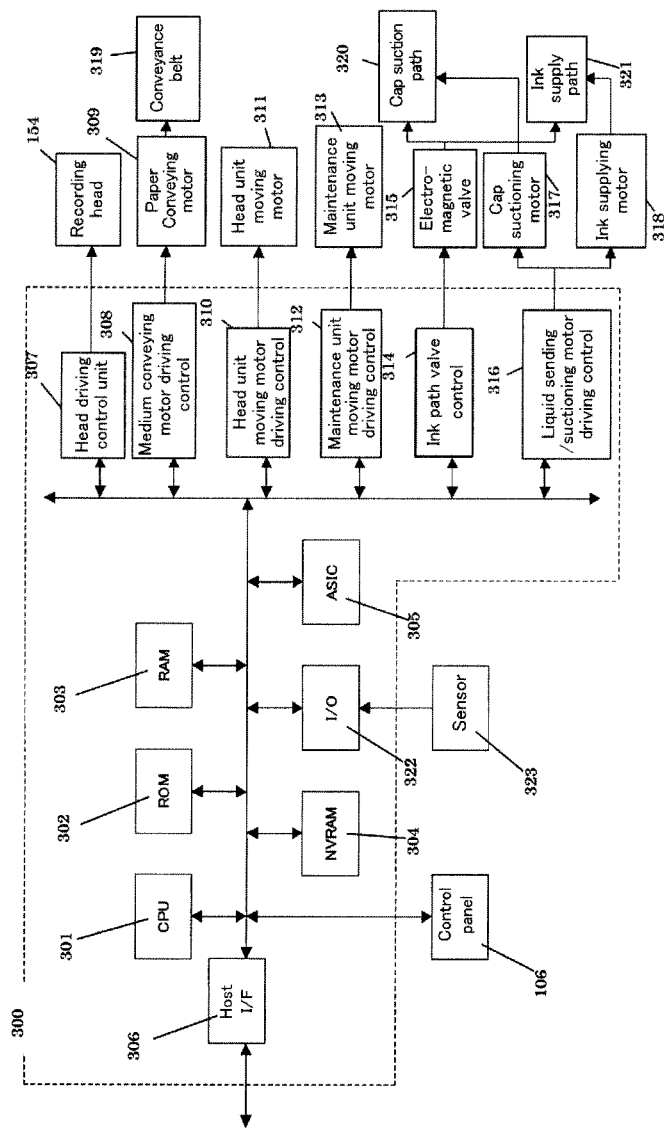
FIG. 2 is a schematic block diagram explaining a control section in FIG. 1.

Note that, FIG. 2 is a schematic block explanatory diagram of the control unit.

The control unit 300 contains: CPU 301 for controlling the entire device; ROM 302 for storing a program CPU 301 executes, and fixed data such as a value for a contamination degree of a nozzle surface relative to an ejection of the ink used in the present invention, a threshold value for the contamination degree of the nozzle surface, and data for a driving wave; RAM 303 for temporarily storing image data and the like; a nonvolatile memory (NVRAM) 304 for keeping data while a power source of the device is shut out; and ASIC 305 for processing input/output signals, such as various signals for the image data and image processing for replacing positions of images, and other input/output signals for controlling the entire device.

Moreover, the control unit 300 contains: a host I/F 306 for sending and receiving data and signals to and from a host; a head drive controlling unit 307 for generating a drive wave for driving and controlling a pressure generating unit of the recording head 154; a recording medium conveying motor driving unit 308 for driving a recording medium conveying motor 309; a head unit moving motor drive controlling unit 312 for driving a head unit (carriage) moving motor 311; an ink channel valve controlling unit 314 for controlling opening and closing of an electromagnetic valve 315 of an ink channel; a delivery/suction motor drive controlling unit 316 for controlling driving of a cap suction motor 317 or ink supplying motor 318; and I/O 322 for inputting detecting signals from an encoder which outputs a detecting signal corresponding to a traveling amount and speed of the conveyance belt 113, detecting signals from a sensor 323 for detecting temperature and humidity environment (or can be either of them), detecting signals on the ink level of each subtank, and detecting signals from various sensors not shown in the diagram. The control unit 300 is connected to a control panel 106 to or on which information necessary to the device is input or displayed.

The control unit 300 receives at the host I/F 306 printing data and the like from a host via a cable or net, and in this case the host is such as an information-processing device (e.g., a personal computer), an image scanning device (e.g., an image scanner), and an imaging device (e.g., a digital camera).

CPU 301 reads out printing data into a receiving buffer contained in the host I/F 306 and analyzes the data, optionally makes the data to image-processed or repositioned by ASIC 305, synchronizes the image data (i.e. dot pattern data) which equivalent of one page for a head width of the recording head 154 with respect to a clock signal, and output the signal to the head drive controlling unit 307.

Then, CPU 301 reads out printing data in the receiving buffer contained in the host I/F 306 and analyzes it. After carrying out necessary image processing or repositioning of the data by ASIC 305, the image data is output to the head drive controlling unit 307. Note that, the formation of the dot pattern data for image output may be stored as font data in, for example, ROM 302. Alternatively, the image data may be expanded to bit map data by a printer driver at the host side, and the bit map data may be output to the device.

The head drive controlling unit 307 selectively applies voltage to a pressure generating unit of the recording head 154 based on the image data (i.e., the dot pattern data) for one page of the recording head 154 input per page, and drives the recording head 154.

Although it is not shown in the diagram, in the case where the treatment liquid is coated by a roller, a control unit of a motor for application, a motor to be controlled, and a sensor for controlling are provided in the device, as it is necessary to control driving of a group of rollers for application, such as coating rollers.

Furthermore, in the case where the treatment liquid is applied by an inkjet method, there is a possibility to cause nozzle clogging due to mixing with other colors, unless the maintenance operation is performed in a different manner from that of the other inks. Therefore, it is desirable that a maintenance unit moving motor is provided for the treatment liquid, separately from that for the ink.

Next, an ink cartridge is explained with reference to FIGS. 5 and 6. FIG. 5 is a diagram illustrating one example of the ink cartridge for use in the present invention, and FIG. 6 is a diagram including a casing (exterior) of the ink cartridge of FIG. 5.

As illustrated in FIG. 5, an ink bag 241 is filled with an aqueous recording ink from an ink inlet 242, and the ink inlet 242 is sealed by fusion bonding after releasing the air from the ink bag 241. At the time of use, a needle attached to the main body of the device is inserted into an ink outlet 243 formed of a rubber member to supply the ink to the device. The ink bag 241 is formed of a wrapping member, such as an air nonpermeable aluminum laminate film. As illustrated in FIG. 6, the ink bag 241 is typically housed in a plastic cartridge case 244, which is then detachably mounted in use to various devices for ejecting a liquid as the ink cartridge 240.

By charging the ink cartridge 240 with the treatment liquid instead of the ink and using the cartridge as a cartridge for a treatment liquid, such cartridge can be used by detachably mounting in various image forming apparatuses, similar to the ink cartridge.

Figure 7:
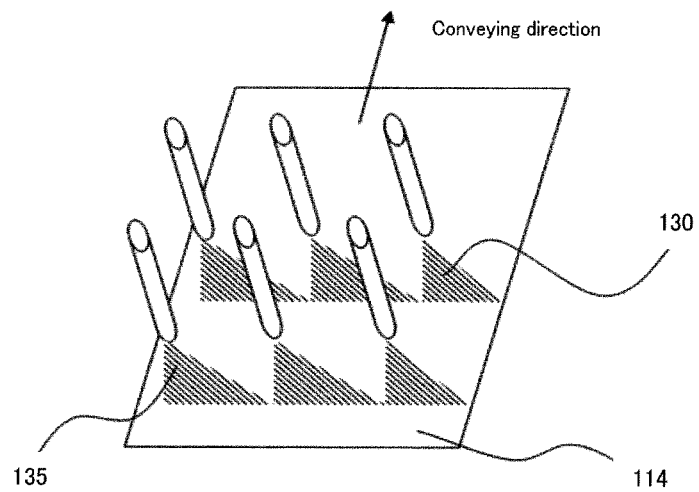
FIG. 7 is a schematic diagram illustrating one example of an ejection system from an ejection head in an image forming apparatus used for the image forming method of the present invention.
Figure 8:
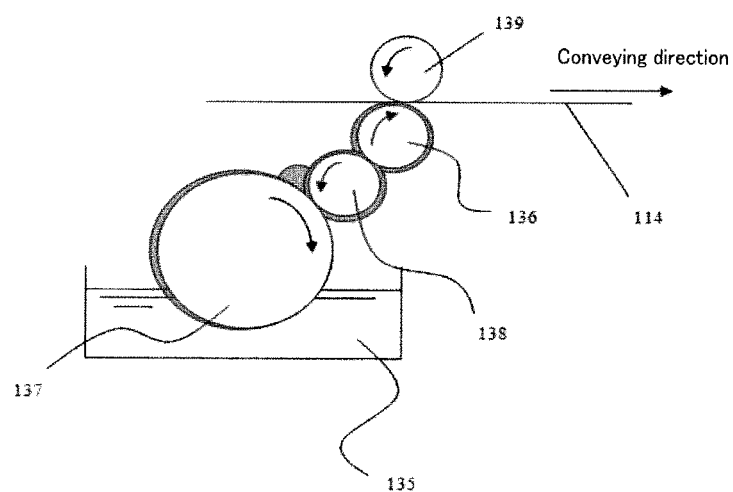
FIG. 8 is a schematic diagram illustrating one example of a coating system by three rollers.
Figure 9:
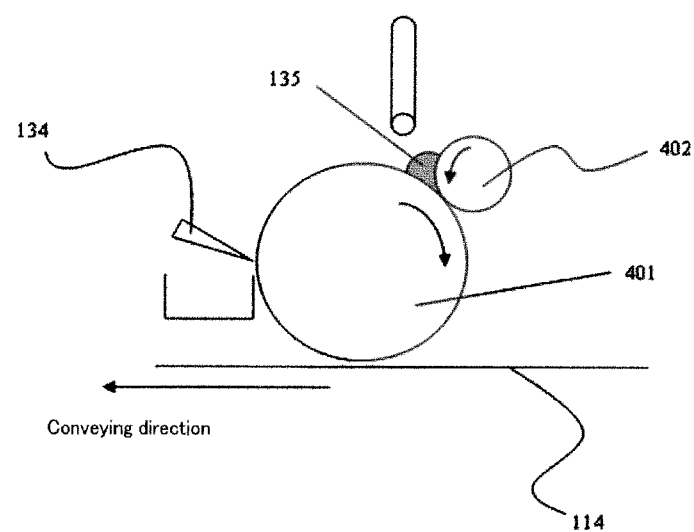
FIG. 9 is a schematic diagram illustrating one example of a coating system by two rollers.

As for the embodiment for applying a treatment liquid onto a recording medium, there are systems illustrated in FIGS. 7 to 9.

FIG. 7 depicts an ejection system from ejection heads. A recording head for ejecting the treatment liquid 135 is provided at the upper stream side of the conveying direction of the recording medium 114, and a recording head for the aqueous recording ink 130 is provided at downstream side of the conveying direction. As a result the treatment liquid 135 ejected in advance based on the predetermined image data can be mixed with the recording ink 130 on the recording medium 114.

FIG. 8 depicts a three-roller coating system, but the detailed explanations thereof are omitted, as they are disclosed in FIG. 1.

FIG. 9 depicts a two-roller coating system. The treatment liquid 135 ejected from an ejection head is applied on the recording medium 114 by controlling the thickness thereof to the predetermined thickness by the coating roller 401 and the film thickness controlling roller 402. Moreover, an excessive treatment liquid remained on the coating roller 401 is corrected by a mobile blade 134. Although it is not illustrated, an ejection heat for a recording ink is provided at the downstream side of the conveying direction in FIG. 9.

EXAMPLES

The present invention is more specifically explained through Examples and Comparative Examples hereinafter, but Examples shall not be construed as to limit the scope of the present invention.

[Aqueous Recording Ink]
(Synthesis of Resin)

A reaction vessel of an automatic polymerization reaction device (polymerization tester DSL-2AS, available from Todoroki Sangyo Co., Ltd.), which had the reaction vessel equipped with a stirrer, a dripping device, a thermosensor, and a nitrogen inlet device provided at the upper side of the vessel, was charged with 550 g of methyl ethyl ketone, and the internal atmosphere of the reaction vessel was replaced with nitrogen gas with stirring. After heating to 80° C. while maintaining the internal atmosphere of the reaction vessel to the nitrogen atmosphere, a mixed solution of 75.0 g of 2-hydroxyethyl methacrylate, 77.0 g of methacrylic acid, 80.0 g of styrene, 150.0 g of butyl methacrylate, 98.0 g of butyl acrylate, 20.0 g of methyl methacrylate, and 40.0 g of t-butylperoxy-2-ethylhexanate (PERBUTYL® O, manufactured by NOF CORPORATION) was added dropwise by the dripping device over 4 hours. After the completion of dripping, the reaction mixture was further allowed to react at the same temperature for 15 hours, to thereby obtain a methyl ethyl ketone solution of an anionic group-containingstyrene-acryl copolymer A having an acid value of 100 mgKOH/g, the weight average molecular weight of 21,000, and Tg (calculated value) of 31° C. After the reaction, part of methyl ethyl ketone was removed under the reduced pressure to adjust the non-volatile component content thereof to 50%. In this manner, a copolymer A solution was obtained.

Preparation Example 1

Preparation of Aqueous Pigment Dispersion Liquid 1

A mixing chamber equipped with a cooling jacket was charged with 1,000 g of carbon black, 800 g of the copolymer A solution obtained in the synthesis example, 143 g of a sodium hydroxide aqueous solution, 100 g of methyl ethyl ketone, and 1,957 g of water, and the resulting mixture was stirred and mixed. The resulting mixture was passed through a disperser (SC Mill SC100, manufactured by Nippon Coke & Engineering Co., Ltd.) filled with zirconia beads having diameters of 0.3 mm to disperse the mixture in a circulation system (a system where the dispersion liquid from the disperser was returned to the mixing chamber) for 6 hours. During this operation, the rotation number of the disperser was set at 2,700 rpm, and cold water was passed through the cooling jacket so that the temperature of the dispersion liquid was kept at 40° C. or lower. After dispersing, the resulting dispersion liquid was taken out from the mixing chamber, followed by washing the mixing chamber and the flow paths of the disperser with 10,000 g of water. This washing water was then combined with the dispersion liquid to thereby obtain a diluted dispersion liquid.

The diluted dispersion liquid was placed in a glass distillation apparatus to remove the entire volume of methyl ethyl ketone, and part of water. After cooling the dispersion liquid to room temperature, 10% by mass hydrochloric acid was added dropwise to adjust the pH to 4.5 with stirring. Thereafter, the solids were collected through filtration performed by a Nutsche filtration device, and the resultant was washed with water. The resulting cake was collected in a container, and 200 g of a 20% by mass potassium hydroxide aqueous solution was added to the cake, followed by dispersing the mixture by a disperser (TK Homodisperser, manufactured by PRIMIX Corporation). To the resulting dispersion, water was added to adjust the non-volatile component, to thereby obtain Aqueous Pigment Dispersion Liquid 1 having the non-volatile component content of 20% by mass, in which the carbon black was covered with a carboxyl group-containing styrene-acryl copolymer neutralized in potassium hydroxide to form composite particles.

Preparation Example 2

Preparation of Aqueous Pigment Dispersion Liquid 2

Aqueous Pigment Dispersion Liquid (cyan) 2 was obtained in the same manner as in Preparation Example 1, provided that the carbon black was eplaced with copper phthalocycnine (SEIKALIGHT BLUE A612, manufactured by Dainichiseika Color & Chemicals Mfg. Co. Ltd.).
(Preparation of Aqueous Recording Ink)

First, a water-soluble organic solvent, a surfactant, a penetrating agent, a pH regulator, an antiseptic agent, and water depicted in Table 1 were homogeneously mixed by stirring for 1 hour. Next, a defoaming agent was added to the mixture, and the resulting mixture was homogeneously mixed by further stirring for 1 hour.

Thereafter, Aqueous Pigment Dispersion Liquid 1 or 2 was added to the mixture, and the resulting mixture was homogeneously mixed by stirring for 1 hour. The obtained mixture was filtered through a polyvinylidene fluoride membrane filter having the average pore diameter of 0.8 μm under pressure to remove coarse particles or dusts, to thereby obtain aqueous recording ink. Note that, the colorant was added into the aqueous recording ink in the manner that the solid content of Aqueous Pigment Dispersion Liquid 1 or 2 was to be 8% by mass.

Examples 1 to 14, Comparative Examples 1 to 3

Preparation of Treatment Liquid

First, a water-soluble organic solvent, a surfactant, a penetrating agent, an antiseptic agent, an anti-rust agent, and water depicted in Table 1 were homogeneously mixed by stirring for 1 hour. Next, a defoaming agent was added, and the resulting mixture was homogeneously mixed by stirring for 1 hour. Thereafter, an amphoteric emulsion resin A (Acrit AKW-107, manufactured by TAISEI FINE CHEMICAL CO., LTD.) or amphoteric emulsion resin B (Acrit RKW-620, manufactured by TAISEI FINE CHEMICAL CO., LTD.), and an anionic polyurethane resin (Rikabond SU-100N, manufactured by CSC Co., Ltd.), a cationic polyurethane resin (HYDRANCP-7050, manufactured by DIC Corporation) were added, and the resulting mixture was homogeneously mixed by stirring for 1 hour, to thereby obtain a treatment liquid.
[Evaluation]

An evaluation sample was produced by the following printing method using the treatment liquid obtained in each of Examples and Comparative Examples, and then was evaluated by the following evaluation methods.
(Printing Method)

The treatment liquid of each of Examples and Comparative Examples prepared by mixing the materials depicted in the treatment liquid formulation was uniformly applied onto a recording medium (OK Topcoat+, manufactured by Oji Paper Co., Ltd.) using a wire bar (coil diameter: 0.05 mm) manufactured by Kobayashi Manufacture Co., Ltd. to give a coating amount of 2 g/m$^2$.

Subsequently, the aqueous recording ink was ejected onto the recording medium by means of a device for ejecting a liquid (IPSIO GXe3300, manufactured by Ricoh Company Limited) to thereby obtain a print sample. Note that, as for a printing chart, a solid image having an area of 3 cm², which was formed with a dot pattern, was used.

The various properties of the print sample, aqueous recording ink, and treatment liquid were evaluated in the following manners.

(Transfer Density (Abrasion Resistance))

A solid imaging part of the solid image having an area of 3 cm², which was formed with a dot pattern, was rubbed with a cloth attached onto a clock meter (manufactured by TOYO SEIKI SEISAKU-SHO, LTD.) and the transfer density of the ink on the cloth after rubbing was measured using a spectrodensitometer (939) manufactured by X-Rite. The lower the transfer density is, the more preferable the fixing ability of the image is.

(Glossiness)

A solid imaging part of the solid image having an area of 3 cm², which was formed with a dot pattern, was measured by means of a glossimeter (GM-60) manufactured by KONICA MINOLTA, INC. The larger measurement value indicates the better glossiness.

(Beading)

A solid imaging part of the solid image having an area of 3 cm², which was formed with a dot pattern, was visually observed, and a level of beading was ranked from 1 to 5. The larger the value is, the more preferable in terms of prevention of beading.

<Evaluation Criteria>

5: Beading was hardly observed.
4: Beading was very slightly observed, but it was not a problematic level.
3: Beading was observed.
2: Beading was significantly observed.
1: Beading was significantly observed (the same level as when no treatment liquid was applied).

(Foaming: Foam Height after 30 Seconds)

The treatment liquid (10 mL) mixed and prepared based on the formulation described in each Comparative Example or each Example was placed in a 100 mL measuring cylinder, and left to stand for 1 day. Thereafter, the measuring cylinder was placed in a thermostat water bath of 10° C. for 30 minutes or longer so that the liquid temperature was entirely constant. After the liquid temperature had sufficiently become constant, air was blown into the liquid with a predetermined syringe to generate foam up to 100 mL. After 30 seconds from foam generation, the height of the foam was visually confirmed.

(Shelf Stability)

The treatment liquid was left to stand in a thermostat of 70° C. for 2 weeks. A difference (viscosity increase level) between the initial viscosity and the viscosity after stored for 2 weeks was measured, and the result was evaluated with the following 3 ranks.

<Evaluation Criteria>

A: The viscosity change rate from the initial viscosity was less than 1%.
B: The viscosity change rate from the initial viscosity was 1% or more but less than 5%.
C: The viscosity change rate from the initial viscosity was 5% or more.

TABLE 1

|  |  |  | Example | | | |
|  |  |  | 1 | 2 | 3 | 4 |
| --- | --- | --- | --- | --- | --- | --- |
| Aqueous recording ink | Colorant | Carbon black | 8.0 | 8.0 | 8.0 | 8.0 |
|  |  | Copper phthalocyanine |  |  |  |  |
|  | Resin | Rosin-modified maleic acid resin | 2.0 | 2.0 | 2.0 | 2.0 |
|  | Water-soluble organic solvent | Glycerin | 22.0 | 22.0 | 22.0 | 22.0 |
|  |  | 1,3-butanediol | 11.0 | 11.0 | 11.0 | 11.0 |
|  | Surfactant | Fluorosurfactant represented by the structural formula (1) | 0.4 | 0.4 | 0.4 | 0.4 |
|  | Defoaming agent | 2,4,7,9-tetramethyldecane-4,7-diol | 1.1 | 1.1 | 1.1 | 1.1 |
|  | Penetrating agent | 1,2-octanediol | 2.0 | 2.0 | 2.0 | 2.0 |
|  | pH regulator | 2-amino-2-ethyl-1,3-propanediol | 0.5 | 0.5 | 0.5 | 0.5 |
|  | Antiseptic agent | LV(S) | 0.1 | 0.1 | 0.1 | 0.1 |
|  | Water | Ion-exchanged water | 52.9 | 52.9 | 52.9 | 52.9 |
|  |  | Total | 100.0 | 100.0 | 100.0 | 100.0 |
| Treatment liquid | Water-soluble organic solvent | Glycerin | 7.0 | 7.0 | 7.0 | 7.0 |
|  |  | 1,3-butanediol | 5.0 | 5.0 | 5.0 | 5.0 |
|  | Amphoteric emulsion resin | Amphoteric emulsion resin A (core: cationic, shell: anionic) active ingredient = 30% | 3.3 | 83.3 | 66.7 | 83.3 |
|  |  | Amphoteric emulsion resin B (core: anionic, shell: cationic) active ingredient = 30% |  |  |  |  |
|  | Polyurethane resin | Cationic polyurethane resin, active ingredient = 30% |  |  |  |  |
|  |  | Anionic polyurethane resin, active ingredient = 30% |  |  |  |  |
|  | Surfactant | Fluorosurfactant (active ingredient: 40 wt %) |  |  |  |  |
|  |  | Polyoxyalkylene alkylether |  |  |  |  |
|  |  | Fluorosurfactant represented by the structural formula (1) | 0.1 | 0.1 | 0.1 | 0.1 |
|  | Defoaming agent | KM-72F |  |  |  |  |
|  |  | N-octyl-2-pyrrolidone | 0.2 | 0.2 | 0.2 | 0.2 |
|  |  | 2,4,7,9-tetramethyldecane-4,7-diol |  |  |  |  |
|  |  | 2,5,8,11-tetramethyldodecane-5,8-diol |  |  |  |  |

TABLE 1-continued

|  |  |  |  |  |  |  |
|---|---|---|---|---|---|---|
| | Penetrating agent | 1,2-octanediol | 2.0 | 2.0 | 2.0 | 2.0 |
| | Antiseptic agent | LV(S) | 0.1 | 0.1 | 0.1 | 0.1 |
| | Anti-rust agent | Benzotriazole | 0.1 | 0.1 | 0.1 | 0.1 |
| | Water | Ion-exchanged water | 82.2 | 2.2 | 18.8 | 2.2 |
| | | Total | 100.0 | 100.0 | 100.0 | 100.0 |
| Treatment liquid evaluation | Foam height after 30 seconds[mL] | | 0 | 0 | 0 | 0 |
| | Shelf stability (viscosity increase level after storing at 70° C. for 2 weeks) | | A | A | B | A |
| Image evaluation | Transfer density | | 0.33 | 0.22 | 0.18 | 0.20 |
| | Glossiness (60° gloss) | | 38 | 45 | 35 | 41 |
| | Beading rank | | 3 | 4 | 5 | 5 |

| | | | Example | | | | |
|---|---|---|---|---|---|---|---|
| | | | 5 | 6 | 7 | 8 | 9 |
| Aqueous recording ink | Colorant | Carbon black | 8.0 | 8.0 | 8.0 | 8.0 | 8.0 |
| | | Copper phthalocyanine | | | | | |
| | Resin | Rosin-modified maleic acid resin | 2.0 | 2.0 | 2.0 | 2.0 | 2.0 |
| | Water-soluble organic solvent | Glycerin | 22.0 | 22.0 | 22.0 | 22.0 | 22.0 |
| | | 1,3-butanediol | 11.0 | 11.0 | 11.0 | 11.0 | 11.0 |
| | Surfactant | Fluorosurfactant represented by the structural formula (1) | 0.4 | 0.4 | 0.4 | 0.4 | 0.4 |
| | Defoaming agent | 2,4,7,9-tetramethyldecane-4,7-diol | 1.1 | 1.1 | 1.1 | 1.1 | 1.1 |
| | Penetrating agent | 1,2-octanediol | 2.0 | 2.0 | 2.0 | 2.0 | 2.0 |
| | pH regulator | 2-amino-2-ethyl-1,3-propanediol | 0.5 | 0.5 | 0.5 | 0.5 | 0.5 |
| | Antiseptic agent | LV(S) | 0.1 | 0.1 | 0.1 | 0.1 | 0.1 |
| | Water | Ion-exchanged water | 52.9 | 52.9 | 52.9 | 52.9 | 52.9 |
| | | Total | 100.0 | 100.0 | 100.0 | 100.0 | 100.0 |
| Treatment liquid | Water-soluble organic solvent | Glycerin | 7.0 | 7.0 | 7.0 | 7.0 | 7.0 |
| | | 1,3-butanediol | 5.0 | 5.0 | 5.0 | 5.0 | 5.0 |
| | Amphoteric emulsion resin | Amphoteric emulsion resin A (core: cationic, shell: anionic) active ingredient = 30% | 33.3 | 33.3 | 33.3 | 33.3 | 33.3 |
| | | Amphoteric emulsion resin B (core: anionic, shell: cationic) active ingredient = 30% | | | | | |
| | Polyurethane resin | Cationic polyurethane resin, active ingredient = 30% | 3.3 | 16.7 | 33.3 | 50.0 | |
| | | Anionic polyurethane resin, active ingredient = 30% | | | | | 14.3 |
| | Surfactant | Fluorosurfactant (active ingredient: 40 wt %) | | | | | |
| | | Polyoxyalkylene alkylether | | | | | |
| | | Fluorosurfactant represented by the structural formula (1) | 0.1 | 0.1 | 0.1 | 0.1 | 0.1 |
| | Defoaming agent | KM-72F | | | | | |
| | | N-octyl-2-pyrrolidone | 0.2 | 0.2 | 0.2 | 0.2 | 0.2 |
| | | 2,4,7,9-tetramethyldecane-4,7-diol | | | | | |
| | | 2,5,8,11-tetramethyldodecane-5,8-diol | | | | | |
| | Penetrating agent | 1,2-octanediol | 0.2 | 2.0 | 2.0 | 2.0 | 2.0 |
| | Antiseptic agent | LV(S) | 0.1 | 0.1 | 0.1 | 0.1 | 0.1 |
| | Anti-rust agent | Benzotriazole | 0.1 | 0.1 | 0.1 | 0.1 | 0.1 |
| | Water | Ion-exchanged water | 48.8 | 35.5 | 18.8 | 2.2 | 37.9 |
| | | Total | 100.0 | 100.0 | 100.0 | 100.0 | 100.0 |
| Treatment liquid evaluation | Foam height after 30 seconds[mL] | | 0 | 0 | 0 | 0 | 0 |
| | Shelf stability (viscosity increase level after storing at 70° C. for 2 weeks) | | A | A | A | B | A |
| Image evaluation | Transfer density | | 0.19 | 0.15 | 0.13 | 0.17 | 0.16 |
| | Glossiness (60° gloss) | | 49 | 51 | 53 | 47 | 50 |
| | Beading rank | | 4 | 5 | 5 | 5 | 5 |

| | | | Example | | | | |
|---|---|---|---|---|---|---|---|
| | | | 10 | 11 | 12 | 13 | 14 |
| Aqueous recording ink | Colorant | Carbon black | 8.0 | 8.0 | 8.0 | 8.0 | 8.0 |
| | | Copper phthalocyanine | | | | | |
| | Resin | Rosin-modified maleic acid resin | 2.0 | 2.0 | 2.0 | 2.0 | 2.0 |
| | Water-soluble organic solvent | Glycerin | 22.0 | 22.0 | 22.0 | 22.0 | 22.0 |
| | | 1,3-butanediol | 11.0 | 11.0 | 11.0 | 11.0 | 11.0 |
| | Surfactant | Fluorosurfactant represented by the structural formula (1) | 0.4 | 0.4 | 0.4 | 0.4 | 0.4 |
| | Defoaming agent | 2,4,7,9-tetramethyldecane-4,7-diol | 1.1 | 1.1 | 1.1 | 1.1 | 1.1 |
| | Penetrating agent | 1,2-octanediol | 2.0 | 2.0 | 2.0 | 2.0 | 2.0 |
| | pH regulator | 2-amino-2-ethyl-1,3-propanediol | 0.5 | 0.5 | 0.5 | 0.5 | 0.5 |

TABLE 1-continued

| | | | | | | | |
|---|---|---|---|---|---|---|---|
| | Antiseptic agent | LV(S) | 0.1 | 0.1 | 0.1 | 0.1 | 0.1 |
| | Water | Ion-exchanged water | 52.9 | 52.9 | 52.9 | 52.9 | 52.9 |
| | | Total | 100.0 | 100.0 | 100.0 | 100.0 | 100.0 |
| Treatment liquid | Water-soluble organic solvent | Glycerin | 7.0 | 7.0 | 7.0 | 7.0 | 7.0 |
| | | 1,3-butanediol | 5.0 | 5.0 | 5.0 | 5.0 | 5.0 |
| | Amphoteric emulsion resin | Amphoteric emulsion resin A (core: cationic, shell: anionic) active ingredient = 30% | | 33.3 | 33.3 | 33.3 | 33.3 |
| | | Amphoteric emulsion resin B (core: anionic, shell: cationic) active ingredient = 30% | 33.3 | | | | |
| | Polyurethane resin | Cationic polyurethane resin, active ingredient = 30% | 16.7 | 16.7 | 16.7 | 16.7 | 16.7 |
| | | Anionic polyurethane resin, active ingredient = 30% | | | | | |
| | Surfactant | Fluorosurfactant (active ingredient: 40 wt %) | | | | | |
| | | Polyoxyalkylene alkylether | | | | 1.0 | |
| | | Fluorosurfactant represented by the structural formula (1) | 0.1 | 0.1 | 0.1 | | 0.1 |
| | Defoaming agent | KM-72F | | | | | |
| | | N-octyl-2-pyrrolidone | 0.2 | | | 2.3 | 0.2 |
| | | 2,4,7,9-tetramethyldecane-4,7-diol | | 0.2 | | | |
| | | 2,5,8,11-tetramethyldodecane-5,8-diol | | | 0.2 | | |
| | Penetrating agent | 1,2-octanediol | 2.0 | 0.2 | 2.0 | 2.0 | 2.0 |
| | Antiseptic agent | LV(S) | 0.1 | 0.1 | 0.1 | 0.1 | 0.1 |
| | Anti-rust agent | Benzotriazole | 0.1 | 0.1 | 0.1 | 0.1 | 0.1 |
| | Water | Ion-exchanged water | 35.5 | 35.5 | 35.5 | 32.5 | 35.5 |
| | | Total | 100.0 | 100.0 | 100.0 | 100.0 | 100.0 |
| Treatment liquid evaluation | Foam height after 30 seconds[mL] | | 0 | 0 | 0 | 0 | 0 |
| | Shelf stability (viscosity increase level after storing at 70° C. for 2 weeks) | | A | A | A | A | A |
| Image evaluation | Transfer density | | 0.18 | 0.15 | 0.16 | 0.16 | 0.14 |
| | Glossiness (60° gloss) | | 48 | 50 | 51 | 53 | 57 |
| | Beading rank | | 5 | 5 | 5 | 5 | 5 |

| | | | Comp. Ex. | | |
|---|---|---|---|---|---|
| | | | 1 | 2 | 3 |
| Aqueous recording ink | Colorant | Carbon black | 8.0 | 8.0 | 8.0 |
| | | Copper phthalocyanine | | | |
| | Resin | Rosin-modified maleic acid resin | 2.0 | 2.0 | 2.0 |
| | Water soluble organic solvent | Glycerin | 22.0 | 22.0 | 22.0 |
| | | 1,3-butanediol | 11.0 | 11.0 | 11.0 |
| | Surfactant | Fluorosurfactant represented by the structural formula (1) | 0.4 | 0.4 | 0.4 |
| | Defoaming agent | 2,4,7,9-tetramethyldecane-4,7-diol | 1.1 | 1.1 | 1.1 |
| | Penetrating agent | 1,2-octanediol | 2.0 | 2.0 | 2.0 |
| | pH regulator | 2-amino-2-ethyl-1,3-propanediol | 0.5 | 0.5 | 0.5 |
| | Antiseptic agent | LV(S) | 0.1 | 0.1 | 0.1 |
| | Water | Ion-exchanged water | 52.9 | 52.9 | 52.9 |
| | | Total | 100.0 | 100.0 | 100.0 |
| Treatment liquid | Water-soluble organic solvent | Glycerin | 7.0 | | 7.0 |
| | | 1,3-butanediol | 5.0 | | 5.0 |
| | Amphoteric emulsion resin | Amphoteric emulsion resin A (core: cationic, shell: anionic) active ingredient = 30% | | 3.3 | 3.3 |
| | | Amphoteric emulsion resin B (core: anionic, shell: cationic) active ingredient = 30% | | | |
| | Polyurethane resin | Cationic polyurethane resin, active ingredient = 30% | | | |
| | | Anionic polyurethane resin, active ingredient = 30% | | | |
| | Surfactant | Fluorosurfactant (active ingredient: 40 wt %) | 0.3 | | |
| | | Polyoxyalkylene alkyl ether | | | |
| | | Fluorosurfactant represented by the structural formula (1) | | 0.1 | |
| | Defoaming agent | KM-72F | 0.2 | | |
| | | N-octyl-2-pyrrolidone | | 0.2 | 0.2 |
| | | 2,4,7,9-tetramethyldecane-4,7-diol | | | |
| | | 2,5,8,11-tetramethyldodecane-5,8-diol | | | |
| | Penetrating agent | 1,2-octanediol | 2.0 | 2.0 | 2.0 |
| | Antiseptic agent | LV(S) | 0.1 | 0.1 | 0.1 |

TABLE 1-continued

|  |  |  |  |  |  |
|---|---|---|---|---|---|
|  | Antirust agent | Benzotriazole | 0.1 | 0.1 | 0.1 |
|  | Water | Ion-exchanged water | 85.3 | 94.2 | 82.3 |
|  |  | Total | 100.0 | 100.0 | 100.0 |
| Treatment | Foam height after 30 seconds[mL] |  | 90 | 0 | 0 |
| liquid evaluation | Shelf stability (viscosity increase level after storing at 70° C. for 2 weeks) |  | A | C | A |
| Image evaluation | Transfer density |  | 0.43 | 0.35 | 0.51 |
|  | Glossiness (60° gloss) |  | 31 | 35 | 40 |
|  | Beading rank |  | 1 | 3 | 2 |

The detail of each component in Table 1 is as follow:
<Fluorosurfactant Represented by the Structural Formula (1)>

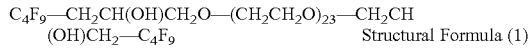
Structural Formula (1)

*Rosin-modified maleic acid resin (HARIMACK R100, manufactured by Harima Chemical Group, Inc.)
*Defoaming agent: KM-72F (self-emulsifying silicone defoaming agent, manufactured by Shin-Etsu Chemical Co., Ltd.)
*Fluorosurfactant (Zonyl FS-300, manufactured by Du Pont Kabushiki Kaisha, active ingredient: 40% by weight) of the treatment liquid 1) It was confirmed from Comparative Example 1 and Example 1 in Table 1 that desirable transfer density, glossiness, and beading can be achieved by adding the water-soluble organic solvent, surfactant, defoaming agent, water, and amphoteric emulsion resin to the treatment liquid.
2) It was confirmed from Comparative Example 1 and Examples 1 to 4 in Table 1 that desirable transfer density, glossiness, and beading can be achieved by adding the amphoteric emulsion resin where the core is cationic and the shell is cationic to the treatment liquid.
3) It was confirmed from Comparative Example 1 and Example 10 in Table 1 that desirable transfer density, glossiness, and beading can be achieved by adding the amphoteric emulsion resin where the core is anionic and the shell is cationic to the treatment liquid.
4) It was confirmed from Comparative Example 1 and Examples 1 to 4 in Table 1 that desirable transfer density, glossiness, and beading can be achieved by adjusting the amount of the amphoteric emulsion resin in the treatment liquid to the range of 1% by mass to 20% by mass.
5) It was confirmed from Comparative Example 1 and Examples 2, 5 to 9 in Table 1 that desirable transfer density, glossiness, and beading can be achieved by further adding the anionic or cationic polyurethane resin to the treatment liquid.
6) It was confirmed from Comparative Example 1 and Examples 2, 5 to 8 in Table 1 that desirable shelf stability, transfer density, glossiness, and beading can be achieved by adjusting the amount of the polyurethane resin in the treatment liquid to the range of 1% by mass to 10% by mass.
7) It was confirmed from Comparative Example 1 and Examples 6 and Example 13 in Table 1 that excellent antifoaming property can be achieved by selecting the surfactant in the treatment liquid from the group consisting of polyoxyalkylene alkyl ether and the fluorosurfactant represented by the structural formula (1).
8) It was confirmed from Comparative Example 1 and Examples 6, 11 to 12 in Table 1 that excellent antifoaming property can be achieved by selecting the defoaming agent in the treatment liquid from the group consisting of N-octyl-2-pyrrolidone, 2,4,7,9-tetramethyldecane-4,7-diol, and 2,5,8,11-tetramethyldodecane-5,8-diol.

The embodiments of the present invention are, for example, as follows:
<1> A treatment liquid for treating a recording medium, containing:
  a water-soluble organic solvent;
  a surfactant;
  water; and
  an amphoteric emulsion resin having a core-shell structure.
<2> The treatment liquid according to <1>, wherein the amphoteric emulsion resin is an amphoteric emulsion resin having a core-shell structure where the core is cationic and the shell is anionic.
<3> The treatment liquid according to <1>, wherein the amphoteric emulsion resin is an amphoteric emulsion resin having a core-shell structure where the core is anionic and the shell is cationic.
<4> The treatment liquid according to any one of <1> to <3>, wherein an amount of the amphoteric emulsion resin is 1% by mass to 20% by mass.
<5> The treatment liquid according to any one of <1> to <4>, further containing an anionic or cationic polyurethane resin.
<6> The treatment liquid according to <5>, wherein an amount of the polyurethane resin is 1% by mass to 10% by mass.
<7> The treatment liquid according to any one of <1> to <6>, wherein the surfactant is at least one selected from the group consisting of polyoxyalkylene alkyl ether, and a fluorosurfactant represented by the following structural formula (1):

Structural Formula (1)

<8> The treatment liquid according to any one of <1> to <7>, further containing a defoaming agent, wherein the defoaming agent is at least one selected from the group consisting of N-octyl-2-pyrrolidone, 2,4,7,9-tetramethyldecane-4,7-diol, and 2,5,8,11-tetramethyldodecane-5,8-diol.
<9> An image forming method, containing:
  applying the treatment liquid according to any one of <1> to <8> onto a recording medium; and,
  applying an aqueous recording ink onto the recording medium,
  wherein the aqueous recording ink contains a colorant, a water-soluble organic solvent, a surfactant, a defoaming agent, and water.
<10> The image forming method according to <9>, wherein the colorant is either a colorant dispersed in a carboxyl group-containing resin, or a colorant encapsulated with a carboxyl group-containing resin as microcapsules.
<11> The image forming method according to any of <9> or <10>, wherein the applying the aqueous recording ink is performed after the applying the treatment liquid.
<12> An image forming apparatus, containing:
  a treatment liquid applying unit configured to apply the treatment liquid according to any one of <1> to <8> onto a recording medium; and a recording ink applying unit configured to apply an aqueous recording ink onto the recording medium, wherein the aqueous recording ink comprises a colorant, a water-soluble organic solvent, a surfactant, a defoaming agent, and water.

<13> The image forming apparatus according to <12>, wherein the colorant is either a colorant dispersed in a carboxyl group-containing resin, or a colorant encapsulated with a carboxyl group-containing resin, as microcapsules.

<14> The image forming apparatus according to according to any of <12> or <13>, wherein the treatment liquid applying unit is either a liquid ejecting unit or a coating unit.

<15> The image forming apparatus according to any one of <12> to <14>, wherein the recording ink applying unit contains an inkjet unit.

This application claims priority to Japanese application No. 2012-247014, filed on Nov. 9, 2012 and incorporated herein by reference.

What is claimed is:

1. A treatment liquid for treating a recording medium, comprising:
   a water-soluble organic solvent;
   a surfactant;
   water;
   an amphoteric emulsion resin having a core-shell structure; and
   an anionic or cationic polyurethane resin.

2. The treatment liquid according to claim 1, wherein the amphoteric emulsion resin is an amphoteric emulsion resin having a core-shell structure where the core is cationic and the shell is anionic.

3. The treatment liquid according to claim 1, wherein the amphoteric emulsion resin is an amphoteric emulsion resin having a core-shell structure where the core is anionic and the shell is cationic.

4. The treatment liquid according to claim 1, wherein an amount of the amphoteric emulsion resin is 1% by mass to 20% by mass.

5. The treatment liquid according to claim 1, wherein an amount of the polyurethane resin is 1% by mass to 10% by mass.

6. The treatment liquid according to claim 1, wherein the surfactant is at least one selected from the group consisting of polyoxyalkylene alkyl ether, and a fluorosurfactant represented by the following structural formula (1):

Structural Formula (1)

7. The treatment liquid according to claim 1, further comprising a defoaming agent, wherein the defoaming agent is at least one selected from the group consisting of N-octyl-2-pyrrolidone, 2,4,7,9-tetramethyldecane-4,7-diol, and 2,5,8,11-tetramethyldodecane-5,8-diol.

8. An image forming method, comprising:
   applying a treatment liquid onto a recording medium; and,
   applying an aqueous recording ink onto the recording medium,
   wherein the treatment liquid contains a water-soluble organic solvent, a surfactant, water, an amphoteric emulsion resin having a core-shell structure, and an anionic or cationic polyurethane resin, and
   wherein the aqueous recording ink contains a colorant, a water-soluble organic solvent, a surfactant, a defoaming agent, and water.

9. The image forming method according to claim 8, wherein the colorant is either a colorant dispersed in a carboxyl group-containing resin, or a colorant encapsulated with a carboxyl group-containing resin as microcapsules.

10. The image forming method according to claim 8, wherein the applying the aqueous recording ink is performed after the applying the treatment liquid.

11. An image forming apparatus, comprising:
    a treatment liquid applying unit configured to apply a treatment liquid onto a recording medium; and
    a recording ink applying unit configured to apply an aqueous recording ink onto the recording medium,
    wherein the treatment liquid contains a water-soluble organic solvent, a surfactant, water, an amphoteric emulsion resin having a core-shell structure, and an anionic or cationic polyurethane resin, and
    wherein the aqueous recording ink comprises a colorant, a water-soluble organic solvent, a surfactant, a defoaming agent, and water.

12. The image forming apparatus according to claim 11, wherein the colorant is either a colorant dispersed in a carboxyl group-containing resin, or a colorant encapsulated with a carboxyl group-containing resin, as microcapsules.

13. The image forming apparatus according to claim 11, wherein the treatment liquid applying unit is either a liquid ejecting unit or a coating unit.

14. The image forming apparatus according to claim 11, wherein the recording ink applying unit contains an inkjet unit.

* * * * *